United States Patent [19]

Maddock

[11] 4,291,491

[45] Sep. 29, 1981

[54] LIQUID HERBICIDE APPLICATOR

[76] Inventor: Mitchell E. Maddock, P.O. Box 24AA, Florence, Ariz. 85232

[21] Appl. No.: 94,715

[22] Filed: Nov. 16, 1979

Related U.S. Application Data

[63] Continuation-in-part of Ser. No. 72,147, Sep. 4, 1979.

[51] Int. Cl.³ .......................................... A01M 21/00
[52] U.S. Cl. ...................................... 47/1.5; 401/140; 401/205; 401/207; 401/285
[58] Field of Search ................... 47/1.5; 401/140, 196, 401/203–207, 285, 289

[56] References Cited

U.S. PATENT DOCUMENTS

| | | | |
|---|---|---|---|
| 1,043,730 | 11/1912 | Rostel | 401/205 |
| 1,131,012 | 3/1915 | Speese | 401/285 X |
| 1,410,620 | 3/1922 | Strieff | 401/203 |
| 1,744,254 | 1/1930 | Zaiden | 401/207 X |
| 2,069,673 | 2/1937 | Lima | 401/204 |
| 2,082,582 | 6/1937 | Kling | 401/207 |
| 2,187,671 | 1/1940 | Suddarth | 401/205 |
| 2,201,236 | 5/1940 | Leopold | 401/205 |
| 2,647,273 | 8/1953 | Eagle | 401/203 |
| 3,021,642 | 2/1962 | Ewing | 47/1.5 |
| 3,161,905 | 12/1964 | Dryden | 401/204 |
| 3,371,980 | 3/1968 | Stefely | 401/285 |
| 4,027,986 | 6/1977 | Patrick | 47/1.5 |
| 4,078,865 | 3/1978 | Moser | 401/207 X |

FOREIGN PATENT DOCUMENTS

| | | | |
|---|---|---|---|
| 96304 | 5/1960 | Norway | 401/205 |
| 22294 | of 1898 | United Kingdom | 401/205 |

Primary Examiner—Steven A. Bratlie
Attorney, Agent, or Firm—Herbert E. Haynes, Jr.

[57] ABSTRACT

A liquid applicator for wipingly applying various liquids to various items includes a liquid supply container mounted on one end of a tubular handle with a shutoff valve for metering liquid flow to the handle. A pair of applicator heads adapted for different liquid application movements are interchangeably mounted on the other end of the handle, and each of the applicator heads have a liquid distributor tube for evenly dispensing the liquid to a wicking element carried by the applicator head.

5 Claims, 11 Drawing Figures

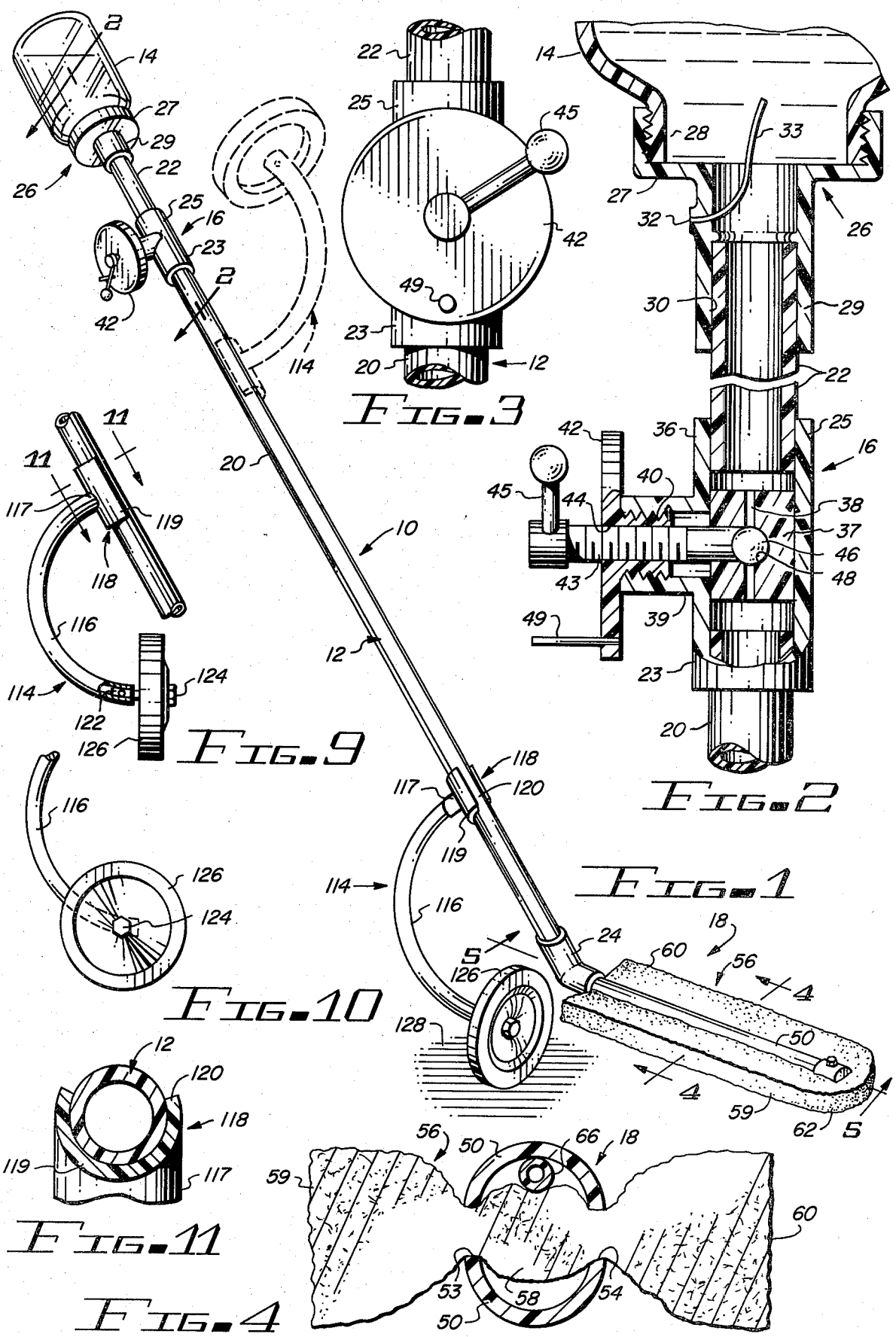

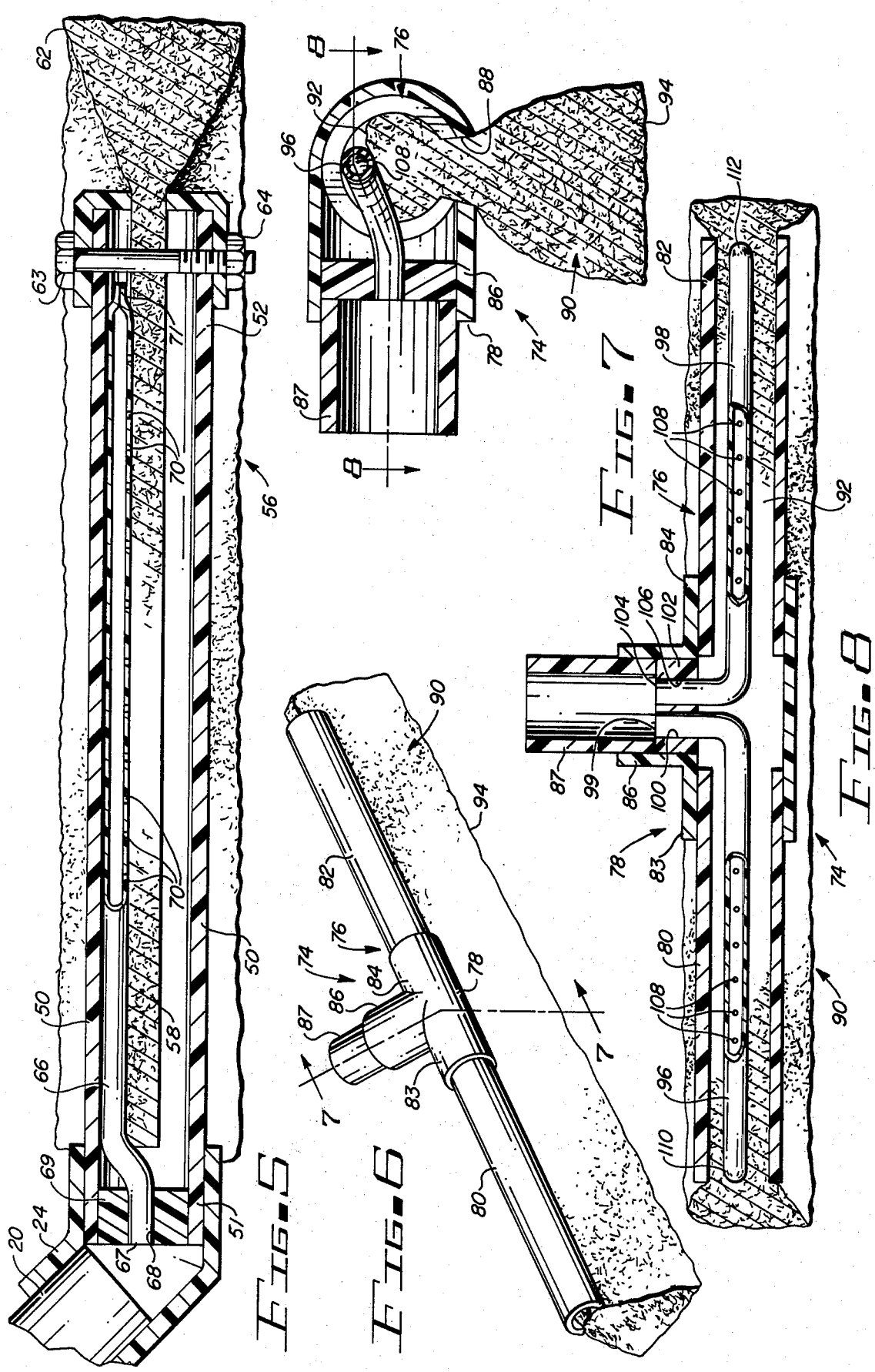

LIQUID HERBICIDE APPLICATOR

CROSS-REFERENCE TO RELATED APPLICATION

This application is a continuation-in-part of copending U.S. Pat. application for: APPARATUS FOR SELECTIVE APPLICATION OF HERBICIDE, Ser. No. 072,147, filed Sept. 4, 1979, by the same inventor.

BACKGROUND OF THE INVENTION

1. Field of the Invention

This invention relates to the application of liquids, and more particularly to an apparatus for applying various liquids to various items at a controllable flow rate.

2. Description of the Prior Art

Many devices have been devised for applying liquids to various items such as a vinegar-water solution to windows, wax on floors, herbicides on weeds, and the like. These prior art devices range all the way from relatively inexpensive, simple mechanisms such as a sponge mounted on the end of a stick for window washing and floor waxing purposes, to much more expensive and complex mechanisms such as spray equipment for applying herbicide. No single device is suited for all liquid application tasks in that each has its limitations and drawbacks.

For example, the simple stick-mounted sponge is normally used by dipping the sponge into the window washing liquid and wipingly applying the saturated sponge to the glass. Such a method almost invariably results in drops landing on the floor as a result of transporting the applicator device from the liquid supply to the glass. Further, the saturated sponge will apply an over abundance of the liquid at the start of the wiping operation and will dry out near the end. The above really presents no serious problems other than requiring that the liquid be spread by repeatedly passing the sponge over the glass to produce a substantially even coating and that the area be cleaned up after completion of the task. Such a device, however, cannot be properly employed for applying herbicide on weeds in that the drops may kill vegetation other than the weeds and will be inconsistent to a point where excessive amounts of this costly herbicide will be applied to some of the weeds and insufficient amounts will be applied to others.

Even the expensive and relatively complex spray applicator devices are not suited for all liquid application tasks. For example, spray application of window washing liquid or floor wax could result in damaged or ruined curtains, rugs, furniture and the like. Further, spraying equipment is not even well suited for all types of herbicide application tasks. To illustrate this point, consider that herbicides, either of the systemic or conventional types, may be applied by a conventional spray method when complete destruction of all plant life in a sprayed area is desired. However, selected herbicidal tasks such as weeding operations, require that the herbicides be selectively applied only to the vegetation that is to be destroyed, and this, of course, eliminates the usage of spraying application techniques.

For the above reasons, it will be seen that due to the multiplicity of liquid application tasks, many specialized devices have been developed with each device being designed to handle a particular type of job.

To be more specific, a special herbicide applicator which is designed primarily for use with systemic herbicide has been developed for use in cultivated fields and this device is in the form of a trailing wick that is attached to a tractor, or other farming mechanism. The special trailing wick applicator is carried by the farm machine so as to follow the furrows between the crop plants. In this manner, the trailing wick applicator will wipe the herbicide on the weeds that are growing in the furrows only in that the trailing wick cannot be allowed to come into close proximity with the crop plants. Thus, such a device is limited in its use in that it cannot be employed to kill vegetation that is proximate any plants that are not to be destroyed, due to the fact that the trailing wick applicator cannot be controlled with any desired degree of accuracy.

A hand held herbicide applicator has been developed for selective application purposes, and that applicator is fully disclosed in U.S. Pat. No. 4,027,986. Briefly, this particular prior art applicator comprises a reservoir handle with a fill and vent control plug on its upper end and an applicator head on its other end. The applicator head is a bell-shaped enlargement which is filled with a foam rubber material and has its lower end wrapped with a carpeting material. The herbicide flows from the reservoir handle through an orifice and saturates the foam rubber and the carpeting material. Although this applicator can be used for selectively applying herbicide on vegetation, its usage is limited to a more or less dabbing type of application due to the particular head configuration. The applicator head is designed primarily for dabbingly applying the herbicide on newly cut tree trunks to kill the root systems thereof and cannot practically and efficiently be used to wipingly apply herbicide to, for example, weeds which have outgrown slower growing grasses, and the like, and it is awkward to use in between closely spaced crop plants.

To the best of my knowledge, no single liquid applicator device has been developed which can be satisfactorily employed for wipingly applying various liquids on various items.

SUMMARY OF THE INVENTION

In accordance with the present invention, a new and improved apparatus is disclosed for wipingly applying an adjustably controllable amount of various liquids on various items. The apparatus comprises an elongated tubular handle having a vented liquid container on its uppermost end with a liquid flow control valve means adjacent the outlet of the container. The lower end of the tubular handle is adapted to demountably receive either of two configurations of liquid applicator heads, with each of these heads being best suited for different types of liquid wiping applications.

The first applicator head configuration is best suited to be used by swinging the end of the apparatus in a horizontal back and forth motion while the user walks so that the liquid will be wipingly applied to items in the swing path. Such a liquid wiping motion is particularly well suited, for example, to wipingly apply liquid herbicide on the tops of weeds which have outgrown slower growing crop plants. This first applicator head configuration includes an elongated tubular support conduit having one end connected to the tubular handle with its other end extending freely therefrom. An elongated planar wicking element is mounted on the support conduit so that its longitudinally extending central portion is in the bore of the support conduit with the longitudinal edges of the wicking element extending from diametrically opposed sides thereof. A perforated liquid distribution tube is mounted in the support conduit for receiving the liquid from the tubular handle and distributing it evenly along the elongated central portion of the planar wicking element.

The second applicator head configuration is best suited for liquid wiping push-pull types of movements toward and away from the user in any plane, or by the user simply pushing it ahead of him in his movement path. This second applicator head includes an elongated tubular support conduit demountably connected intermediate its opposite ends to the lower end of the tubular handle so as to be transverse thereto and have oppositely extending branch conduits. An elongated planar wicking element is mounted on the support conduit so that one of its longitudinal edges is in the bore thereof, and its opposite longitudinal edge extends therefrom. A pair of perforated liquid distribution tubes are mounted in the support conduit with each tube lying in a different branch conduit thereof. The tubes receive the liquid from the tubular handle and distribute it evenly along the length of the wicking element.

Accordingly, it is an object of the present invention to provide a new and improved liquid applicator.

Another object of the present invention is to provide a new and improved apparatus for wipingly applying various liquids on various items.

Another object of the present invention is to provide a new and improved apparatus for wipingly applying adjustably controllable amounts of various liquids on various items.

Another object of the present invention is to provide a new and improved liquid applicator of the above described character having interchangeable applicator heads each configured for a different type of liquid wiping application.

Another object of the present invention is to provide a new and improved liquid applicator of the above described type in which one of the applicator heads is adapted to wipingly apply the liquid in a sweeping back and forth motion in a substantially horizontal plane.

Another object of the present invention is to provide a new and improved liquid applicator of the above described character in which the other applicator head is adapted to wipingly apply the liquid in a push-pull motion toward and away from the user.

Another object of the present invention is to provide a new and improved liquid applicator of the above described type in which the applicator heads include elongated wicking elements and have perforated liquid distribution tubes for evenly distributing the liquid to the wicking elements.

Still another object of the present invention is to provide a new and improved liquid applicator of the above described character which includes a tubular handle having a vented liquid container on one end thereof and having its other end adapted for demountable connection to either of the liquid applicator heads.

Yet another object of the present invention is to provide a new and improved liquid applicator of the above described character which further includes a liquid flow control valve means mounted in the tubular handle for controlling the flow of the liquid from the container to the applicator head.

The foregoing and other objects of the present invention, as well as the invention itself, may be more fully understood from the following description when read in conjunction with the accompanying drawings.

BRIEF DESCRIPTION OF THE DRAWINGS

FIG. 1 is a perspective view of the liquid applicator of the present invention and showing a first one of the demountably interchangeable applicator heads mounted thereon.

FIG. 2 is an enlarged fragmentary sectional view taken along the line 2—2 of FIG. 1 and partially broken away to illustrate the various features thereof.

FIG. 3 is an elevational view of a fragmentary portion of that part of the liquid applicator shown in FIG. 2 and illustrating the controls of the liquid flow control valve means.

FIG. 4 is an enlarged fragmentary sectional view taken on the line 4—4 of FIG. 1.

FIG. 5 is an enlarged fragmentary sectional view taken on the line 5—5 of FIG. 1.

FIG. 6 is a perspective view of the second one of the demountably interchangeable applicator heads.

FIG. 7 is an enlarged sectional view taken on the line 7—7 of FIG. 6.

FIG. 8 is a sectional view taken on the line 8—8 of FIG. 7.

FIG. 9 is a fragmentary elevational view of an optional wheel assembly means for use with the liquid applicator of the present invention.

FIG. 10 is a view similar to FIG. 9 and showing an alternate wheel position.

FIG. 11 is an enlarged fragmentary sectional view taken on the line 11—11 of FIG. 9.

DESCRIPTION OF THE PREFERRED EMBODIMENTS

Referring more particularly to the drawings, FIG. 1 illustrates the liquid applicator of the present invention which is indicated in its entirety by the reference numeral 10.

The liquid applicator 10 includes, as will hereinafter be described in detail, an elongated tubular handle 12 having a liquid supply container 14 mounted on its upper end, a liquid flow control valve means 16 mounted in the handle adjacent the container, and a first applicator head 18 demountably mounted on its lower end.

As seen in FIGS. 1 and 2, the tubular handle 12 includes an elongated tubular conduit 20 which forms the lower portion thereof, and a considerably shorter tubular conduit 22 which forms the upper portion, and the liquid flow control valve means 16 is interposed therebetween. The elongated tubular conduit 20 has its upper end coupled to the outlet port 23 of the flow control valve means 16 and its lower end has an elbow 24 fixedly attached thereon to which the applicator head 18 is demountably coupled. The upper tubular conduit 22, which may be used as a handle grip, has its lower end connected to the inlet port 25 of the valve means 16.

The upper end of the tubular conduit 22 has a container mounting means 26 fixedly attached thereto and configured with an internally threaded lid portion 27 for demountably receiving the neck 28 of the liquid supply container 14 which may be in any suitable form such as the bottle shown. The container mounting means 26 further includes a boss 29 which extends axially from the lid 27 and the upper end of the tubular conduit 22 is fixedly mounted in the bore 30 of the boss. A port 32 extends laterally from the bore 30 of the boss 29 and a vent tube 33 is fixedly mounted therein and extends upwardly into the container 14 to admit air thereto to prevent forming a partial vacuum which would stop liquid flow.

The flow control valve means 16 may be any suitable manually operated shutoff valve such as the one shown best in FIG. 2. The valve 16 includes a tee-housing 36 having the previously mentioned inlet point 25 and outlet port 23 which are arranged in axial alignment with respect to each other, and a valve body 37 is mounted intermediate those ports. The body 37 has an axial passage 38 formed therethrough so as to communicate between the inlet and outlet ports 25 and 23, respectively. The tee-housing 36 has a boss 39 extending laterally therefrom, and the boss 39 is internally threaded to receive the reduced diameter porton 40 of a face plate member 42. A threaded rod 43 is mounted in an axial bore 44 formed through the face plate member 42, and a suitable handle 45 is fixedly attached to one end thereof and a ball 46 is fixedly attached to the other end. When the rod 43 is moved in a fully rotated clockwise direction (FIG. 3), the ball 46 is positioned so as to be seated in a valve seat 48 of the body 37 which is formed to transversely intersect the passage 38 thereof. Rotation of the handle 45 in the opposite direction, counterclockwise, will unseat the ball 46 and thus allow liquid flow through the passage 38. A pin 49 is mounted so as to extend eccentrically from the face plate member 42, and serves as a stop to limit rotation of the handle 45, and therefore will limit movement of the ball 46.

The liquid applicator head 18, as seen in FIGS. 1, 4 and 5, includes an elongated tubular support conduit 50 one end 51 of which is slidably received in the elbow 24 so as to be demountably attached thereto, with the other end 52 extending freely therefrom. The support conduit 50 has a pair of diametrically opposed slots 53 and 54 (FIG. 4) formed therein so as to extend longitudinally from the free end 52 to a point proximate its other end 51. An elongated planar wicking element 56 of substantially rectangular configuration is clampingly mounted in the slots 53 and 54 of the tubular support conduit 50 so that its longitudinally extending central portion 58 is located in the bore of the support conduit and forms a liquid absorbing portion, and its longitudinal edge 59 which forms a liquid wiping portion extends laterally therefrom through the slot 53, and its opposite longitudinal edge 60 which forms another liquid wiping portion of the wicking element extends similarly through the slot 54. The front end edge 62 of the wicking element 56 extends beyond the free end 52 of the conduit 50, and a suitable fastener means such as the bolt 63 and nut 64 pass transversely through the free end 52 to hold the slotted conduit 50 in the wicking element clamping position as seen best in FIG. 5.

The wicking element 56, which is preferably of synthetic sponge material or the like, will swell upon absorbing liquid and will shrink and become relatively hard when allowed to dry, as is common in all such materials. When such a dried wicking element is wetted for use, the liquid will leak quite severely from the slotted tubular support conduit 50 until such time as the wicking element swells and softens, and such leaking will continue until the entire length of the element becomes saturated with the liquid. To overcome this problem, the liquid applicator head 18 is provided with an elongated liquid distribution tube 66. The liquid distribution tube 66 is mounted in the bore of the tubular support conduit 50 so as to rest on top of the longitudinally extending central portion 58 of the wicking element. One end 67 of the distribution tube 66 is fixedly mounted in a bore 68 that is formed axially through a plug 69 which is sealingly mounted in the tubular support conduit 50 adjacent its end 51. In this manner, liquid in the tubular handle 12 will enter the liquid distribution tube 66 and will be prevented from entering directly into the tubular support conduit 50. The liquid distribution tube 66 is provided with a plurality of apertures 70 that are arranged in spaced increments along its length, and the free end 71 of the distribution tube is sealingly closed. Thus, the liquid received in the distribution tube 66 will be distributed evenly along the length of the longitudinally extending central portion 58 of the wicking element 56, and such distribution is at a relatively slow rate to allow the wicking element to swell and soften for slot closing purposes. This applicator head 18 is designed primarily for use in a swinging back and forth type of wiping application in a substantially horizontal plane as hereinbefore discussed.

A second applicator head, which is shown in FIGS. 6, 7 and 8 and is indicated therein generally by the reference numeral 74, is best suited for a push-pull type of liquid wiping application. The applicator head 74 includes an elongated tubular support conduit 76 which is formed by a tee 78 located centrally between an oppositely extending pair of branch conduits 80 and 82. The tee 78 is of conventional configuration having an opposed pair of aligned ports 83 and 84 from which the branch conduits 80 and 82 extend. The other laterally extending port 86 of the tee 78 has a stub conduit 87 fixedly attached thereto, by which the applicator head 74 is demountably attachable to the elbow 24 of the tubular handle 12. An elongated slot 88 is formed in the tubular support conduit 76 so as to extend longitudinally therethrough, and an elongated planar wicking element 90 is supportingly carried by the support conduit. The wicking element 90 which is of substantially rectangular configuration, is clampingly held in the slot 88 so that one of its longitudinal edges 92, which forms a liquid absorbing edge, is disposed in the bore of the tubular support conduit 76, and the other longitudinal edge 94, which provides the wicking element with the liquid wiping edge, is spaced from and coextending with the conduit.

A first liquid dispenser tube 96 is positioned in the bore of the tubular support conduit 76 so as to lie atop that portion of the longitudinal edge 92 of the wicking element which lies in the branch conduit 80. A second liquid dispenser tube 98 is similarly positioned in the support conduit so as to lie on the other portion of the same edge 92 of the wicking element 90 which is disposed in the other branch conduit 82. One end 99 of the first tube 96 is fixedly mounted in a first bore 100 formed axially through a plug 102, and one end 104 of the second distributor tube 98 is similarly mounted in a second bore 106 formed through the plug 102. The plug 102 is sealingly mounted in the lateral port 86 of the tee 78 so that liquid from the tubular handle 12 will be received in the liquid dispensing tubes 96 and 98 and will be prevented from directly entering into the support conduit 76. The liquid dispensing tubes 96 and 98 each have a plurality of apertures 108 formed in spaced increments along their respective lengths and the free ends 110 and 112 of the tubes 96 and 98, respectively, are sealingly closed. Thus, the liquid dispensing tubes 96 and 98 will operate in the same manner as the previously described dispensing tube 66 to evenly dispense the liquid to the wicking element 90 at a relatively slow rate.

An optional wheel assembly means 114 may be provided on the liquid applicator 10 of the present invention, with the wheel means 114 being repositionably attached to the tubular handle 12 in an operative position adjacent the lower end of the tubular handle 12 as shown in solid lines in FIG. 1, or in a stowed position adjacent the upper end of the tubular handle 12 as shown in dashed lines in the same Figure.

The wheel assembly means 114 includes an arcuate rod 116 having the boss 117 of a special tee 118 fixedly mounted on one end thereof. The transverse tubular portion 119 of the tee 118 has an opening 120 formed longitudinally therethrough so that the tubular member 119 defines an arc of slightly more than 180° in cross section. With such a configuration, the tee 118 may be snapped onto the tubular handle 12 and will grippingly engage the periphery thereof.

A plug 122 is mounted fast in the other end of the arcuate rod 116 and is adapted to threadingly receive a wheel axle bolt 124 axially therein as shown in FIG. 9, or transversely as shown in FIG. 10, and a wheel 126 is rotatably carried on the axle bolt 124.

When the liquid applicator 10 is equipped with the applicator head 18, and the wheel assembly 114 is mounted in the operative position with the wheel 126 mounted on the rod 116 as shown in FIG. 9, the wheel will rotate on the surface 128 (FIG. 1) to facilitate the sweeping, wiping type of liquid application that the head 18 is designed for. Further, the wheel assembly means 114 is axially slidable on the tubular handle 12 which allows the spaced distance between the applicator head 10 and the surface 128 to be adjusted as desired. When the liquid applicator 10 has the applicator head 74 mounted thereon (not shown), the wheel 126 may be mounted on the rod 116 in the manner shown in FIG. 10 to facilitate the push-pull wiping motion for which the applicator head 74 is designed, and the wheel assembly 114 is axially slidable for height adjusting purposes.

While the principles of the invention have now been made clear in illustrated embodiments, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. An applicator for manual application of liquid herbicide to undesired vegetation growing at ground level, said applicator comprising:
    (a) a tubular handle of elongated configuration for manual holding at a downwardly and forwardly extending angle which defines an application position;
    (b) a vented liquid herbicide supply container means on the end of said tubular handle which is upwardly disposed when said tubular handle is in the application position for supplying liquid herbicide to the bore of said tubular handle;
    (c) shutoff valve means in said tubular handle and operable to meter the flow of liquid herbicide from said supply container means to the bore of said tubular handle;
    (d) an elongated applicator head extending angularly and forwardly from the other end of said tubular handle so as to lie in a substantially horizontal plane when said tubular handle is in the application position, said applicator head including,
    I. an elongated tubular support conduit one end of which is mounted on the other end of said tubular handle and having at least one elongated slot formed longitudinally in the side thereof,
    II. an elongated planar wicking element clampingly mounted in the slot of said tubular support conduit so that an elongated liquid absorbing portion thereof is disposed in the bore of said tubular support conduit and at least one elongated liquid wiping portion extends laterally from said tubular support conduit and is coextensive therewith,
    III. an elongated liquid dispenser tube in the bore of said tubular support conduit and lying along the liquid absorbing portion of said wicking element, said liquid dispenser tube having one end in communication with the bore of said tubular handle for receiving liquid herbicide therefrom and being longitudinally perforated for evenly distributing the received liquid herbicide along the length of the liquid absorbing portion of said wicking element; and
    (e) whereby said wicking element absorbingly receives the liquid herbicide from said liquid dispenser tube for wiping application thereof on undesired vegetation when said tubular handle is held in the application position and moved so as to swing said applicator head back and forth in a substantially horizontal plane.

2. An applicator as claimed in claim 1 wherein said applicator head further comprises:
    (a) said tubular support conduit having its opposite end extending freely from said tubular handle;
    (b) said tubular support conduit having a diametrically opposed pair of elongated slots formed longitudinally in the sides thereof so as to extend from its opposite free end to a point adjacent the one of its ends which is mounted on said tubular handle; and
    (c) said wicking element being of substantially rectangular configuration with its longitudinally extending central portion located in the bore of said tubular support conduit to form the liquid absorbing portion of said wicking element and having its longitudinal edges extending laterally and oppositely from said tubular support conduit through the slots thereof to provide said wicking element with two liquid wiping portions.

3. A liquid applicator as claimed in claim 2 wherein one of the end edges of said wicking element extends through the opposite free end of said tubular support conduit to provide said wicking element with another liquid wiping portion.

4. A liquid applicator as claimed in claim 2 and further comprising fastener means passing transversely through the opposite free end of said tubular support conduit for clampingly holding said wicking element therein.

5. A liquid applicator as claimed in claim 2 wherein said applicator head further comprises a plug sealingly mounted in the bore of said tubular support conduit adjacent the end thereof which is coupled to said tubular handle, said plug having an axial bore formed therethrough which has the one end of said liquid dispenser tube mounted therein.

* * * * *